United States Patent [19]

Norden

[11] Patent Number: 4,826,379

[45] Date of Patent: May 2, 1989

[54] PUSH NUTS AND PUSH-NUT FASTENERS

[75] Inventor: Alexander R. Norden, New York, N.Y.

[73] Assignee: Connectron, Inc., Laurence Harbor, N.J.

[21] Appl. No.: 156,490

[22] Filed: Feb. 16, 1988

[51] Int. Cl.⁴ ............................................. F16B 35/00
[52] U.S. Cl. .................................... 411/366; 411/437; 411/510; 411/512; 411/908; 411/414
[58] Field of Search ............... 411/366, 411, 414, 437, 411/508–510, 512, 907, 908

[56] References Cited

U.S. PATENT DOCUMENTS

| | | | |
|---|---|---|---|
| 1,092,256 | 4/1914 | Glauber | 411/437 |
| 1,705,811 | 3/1929 | Eidel | 411/437 |
| 4,435,111 | 3/1984 | Mizusawa | 411/437 |
| 4,518,297 | 5/1985 | Kraus | 411/437 |
| 4,571,136 | 2/1986 | Peek | 411/437 |
| 4,600,344 | 7/1986 | Sutenbach et al. | 411/435 |
| 4,728,236 | 3/1988 | Kraus | 411/437 |
| 4,756,654 | 7/1988 | Clough | 411/437 |
| 4,770,582 | 9/1988 | Junemann et al. | 411/182 |

FOREIGN PATENT DOCUMENTS

| | | | |
|---|---|---|---|
| 651985 | 11/1962 | Canada | 411/510 |
| 0153489 | 12/1984 | European Pat. Off. | 411/433 |
| 2010321 | 9/1971 | Fed. Rep. of Germany | 411/433 |
| 2112802 | 10/1971 | Fed. Rep. of Germany | 411/512 |
| 1020694 | 7/1964 | United Kingdom | 411/510 |
| 1428261 | 3/1976 | United Kingdom | 411/437 |

Primary Examiner—Gary L. Smith
Assistant Examiner—Douglas E. Ringel

[57] ABSTRACT

A push nut and a male member are disclosed having cooperating buttress threads. The push nut is divided into sectors, each of which has multiple segments that comprise the nut's thread. The adjacent edges of the successive sectors are connected to each other by a resilient corrugation arranged to distribute the stress equally between the ends of each thread segment and equally among the thread segments of each sector.

7 Claims, 1 Drawing Sheet

U.S. Patent May 2, 1989 4,826,379
FIG.2
FIG.1
FIG.3
FIG.5
FIG.4
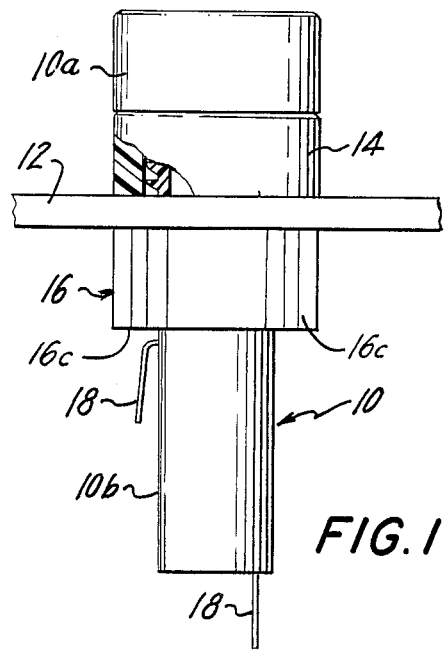
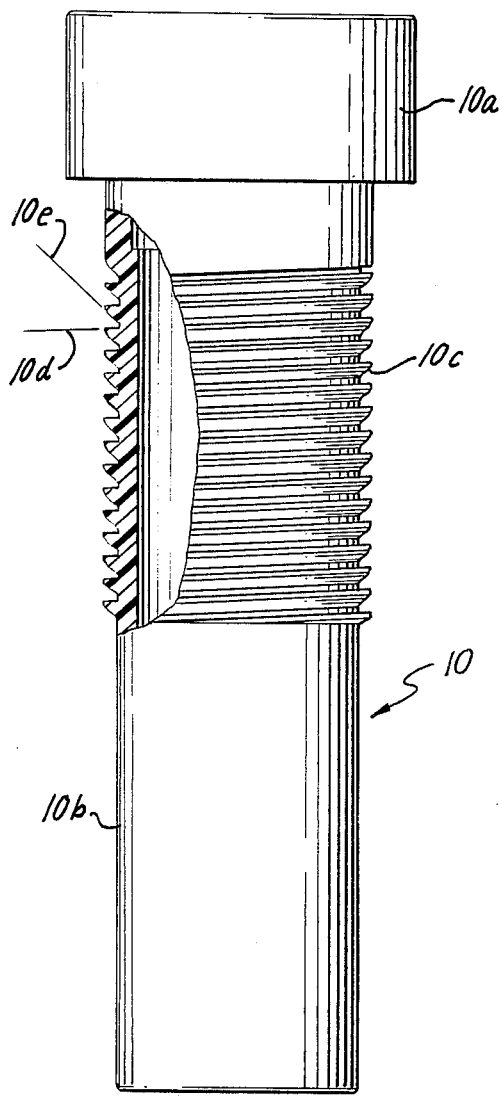
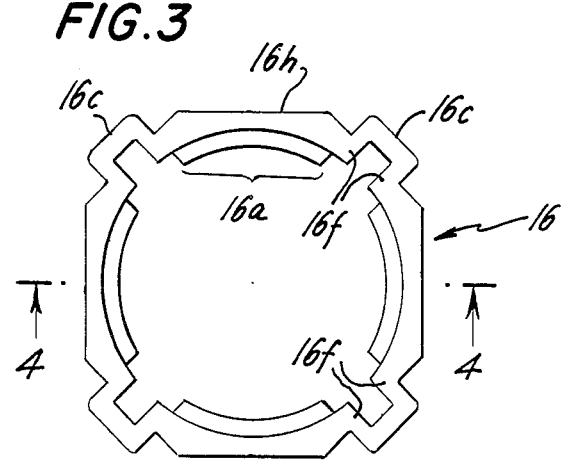
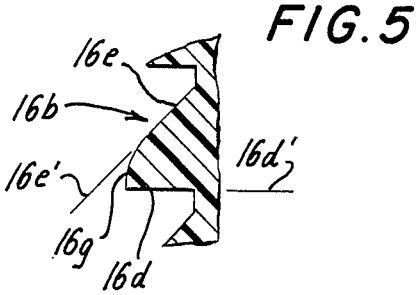
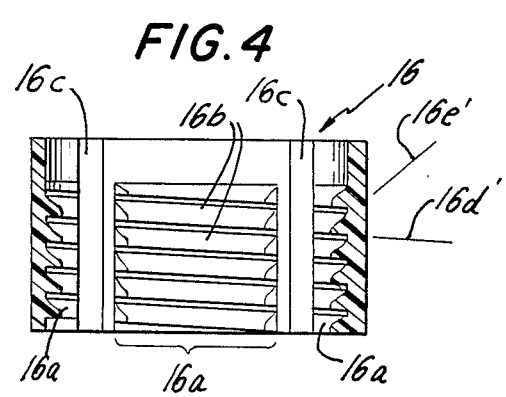

PUSH NUTS AND PUSH-NUT FASTENERS

BACKGROUND OF THE INVENTION

The present invention relates to novel nuts, especially push nuts, and to fasteners that include push nuts.

Push-nut fasteners include a post of metal or plastic and a push nut that is specially shaped to be pushed onto the post with some effort. Removal of a push nut by pushing it in the opposite direction requires vastly more effort.

A widely used form of push-nut fastener has a nut in the form of a sheet-metal stamping having a hole whose outline includes two or more inward-directed tabs. The innermost edges of these tabs form a circle slightly smaller than the diameter of the post; the push nut is resilient; and the tabs slant toward the center in such a manner that, as the push nut is pushed onto the post, the tab tips lag slightly behind the rest of the push nut. The tabs have sharp corners or edges which tend to dig into the post.

The tabs of such push nuts are sometimes angled in the manner of screw-thread segments so that the push nut might be removed by an unscrewing motion. In practice, it is usually impossible to "unscrew" such push nuts. Moreover, each tab develops a considerable amount of local force tending to distort the post. Such distortion may rule out the use of this kind of push-nut fasteners where the post is a thin-wall tube.

Fasteners having push nuts have been proposed, wherein the push nut is divided circumferentially into multiple sectors each bearing multiple thread segments. Each sector is supported in a yielding manner for providing the push-on characteristic. However, the resulting push nuts are commonly disproportionately large and complicated and, considering their size, the retentive strength seems low.

SUMMARY OF THE INVENTION

The present invention provides a novel fastener including a novel nut, particularly a push nut, and a companion male threaded member such as a stud, a bolt, a hollow tube, etc. In the preferred embodiment of the invention detailed below, the nut includes multiple sectors each extending partway around the male threaded member and each sector has a number of thread segments distributed along the passage through the nut. The thread segments serve collectively as a female thread. A resilient corrugation extends along each side margin of each sector and each corrugation connects the side edges of two neighboring sectors. The term "resilient corrugation" is used to represent, as well, equivalent elongated flexible connections. A corrugation of "U"-shaped cross-section—a channel with flexible walls—is most practical, being highly effective and being easily formed.

Because each corrugation extends along a side of a sector, the constraint provided by the corrugation is distributed essentially uniformly among all of the thread segments of a sector and, considering all of the sectors, the whole complement of thread segments contribute essentially equally to the retentive strength of the nut. As a further consideration, since there are resilient corrugations at the opposite side edges of each sector, both ends of each thread segment contribute alike to the retentive strength of the nut. Both of these considerations contribute to the efficient utilization of each of the thread segments and efficient utilization of the material forming the threads.

In concept, the illustrative push nut can be made of metal, but in many practical applications it is of a molded plastic. The companion male member may also be made of metal or plastic. For push nuts of any material, the effort required to force the nut off the male member—its retentive strength—is enhanced by using buttress threads, thereby providing a shoulder along one side of each segment of the push-nut's thread to abut a shoulder at one side of the male buttress thread. The opposite side of the thread of either the nut or the male member, or both, slants prominently to make it relatively easy for the push nut to be pushed onto the male member. The push-on force causes the sectors of the push nut to spread outward, approximating a larger diameter of the nut's bore. All of the female thread segments ratchet across the male threads during the push-on motion.

The corrugations connecting each segment of the nut to the adjacent segment are flexible; they become resiliently distorted to accommodate spreading of the nut's sectors. However, the distortion of the corrugations is moderate and their shape is restored after the push-on motion.

To special advantage, the nut is a one-piece molded plastic part, thus being homogeneous. The resilient corrugations and the sectors interconnected by the corrugations are continuous portions of the same material. Thermoplastics in general provide shape retention for the threads and resilience for the corrugations, but polycarbonates and most grades of nylon are especially effective.

Each sector of the nut has multiple thread segments and because the corrugations extend all along the series of thread segments of each sector, each end of each thread segment is directly restrained by the adjoining corrugation. Accordingly, all of the thread segments contribute equally to the push-off resistance of the nut, and both ends of each thread segment are equally effective.

BRIEF DESCRIPTION OF THE DRAWINGS

The nature of the invention and its various novel aspects and advantages will be best appreciated from the following detailed description and the accompanying drawings. In the drawings:

FIG. 1 is an enlarged elevation of an assembly illustrating an application of the invention;

FIG. 2 is a lateral view, partly in cross-section, of a male threaded member forming part of the assembly of FIG. 1;

FIG. 3 is a top plan view of a push nut forming part of the assembly of FIG. 1;

FIG. 4 is a vertical cross-section of the push nut of FIG. 3 at the plane 4—4 of FIG. 3, the scale of FIGS. 2-4 being twice that of FIG. 1; and FIG. 5 is a greatly enlarged fragment of FIG. 4.

DESCRIPTION OF THE PREFERRED EMBODIMENT

In FIG. 1, a hollow fuse holder 10 is shown mounted on a panel 12. A spacer 14 above the panel causes the top of the fuse holder to project prominently from panel 12. Spacer 14 may be omitted, and then head 10a of the fuse holder would bear directly against panel 12.

Nut 16 is threaded onto fuse holder 10, holding panel 12 tightly against spacer 14 and head 10a of the fuse holder. The holes through panel 12 and spacer 14 are slightly larger in diameter than the threaded portion 10c of the fuse holder. Fuse holder 10 has projecting terminals 18. It is generally hollow and thin-walled and made of molded plastic.

Parts 10 and 16 form a push-on fastener shown in some detail in FIGS. 2-5.

Buttress threads are formed along a substantial length 10c of part 10, so that nut 16—of much shorter length—can be used either to grip both panel 12 and spacer 14 or (omitting spacer 14) to grip panel 12 alone. The cross-section of the threads of part 10 have a shoulder that faces head 10a and is essentially perpendicular to the axis; and the cross-section of the thread has a prominently slanted cam side opposite the thread's shoulder. Lines 10d and 10e in FIG. 2 represent the relationship of the thread's shoulder and cam side, respectively, to each other and to the axis of part 10.

As seen in FIGS. 3 and 4, nut 16 is divided into four sectors 16a distributed around the passage which extends through the nut. Each sector 16a has a series of thread segments 16b distributed along the axis of the nut; the thread segments 16b of all the sectors 16a collectively form a female thread that mates with the male thread of part 10. Each thread segment 16b extends most of the way across its sector 16a.

Each sector 16a has opposite sides that are adjacent to sides of neighboring sectors 16a. The adjacent sides of two successive neighboring sectors 16a are connected to each other by a resilient corrugation 16c. Thus, in the illustrated example there are four sectors 16a and four resilient corrugations that flexibly connect each sector 16a to the next.

The cross-section of each corrugation is U-shaped. Each corrugation is resilient, and it is of a form that can flex and expand so as to accommodate forcible displacement of sectors 16a outward, enlarging the passage through the nut. The extremities 16f of the corrugations (the junctions of each resilient corrugation with the sides of adjoining sectors 16a) become spread as thread segments 16b ratchet past threads 10c.

The resilience of the flexible corrugations imposes a reverse constraint on the segments 16a. That reaction is distributed with essential uniformity along and among the series of thread segments 16b on each sector 16a. Moreover, since the constraint of the resilient corrugations 16c acts on both sides of each sector 16a, the constraint acts equally on both ends of each thread segment 16b. The overall effect is that the entire complement of thread segments are all active alike, and from end to end, in performing their functions. This represents effective and efficient utilization of all the thread segments, and of the material that forms those thread segments. As will be seen, the described full-fledged participation of all the thread segments 16b enhances the resistance of the described fastener to disassembly forces without corresponding increase in the required push-on effort.

The thread segments 16b are complementary to the male thread along portion 10c of part 10. Accordingly, shoulder 16d is approximately perpendicular to the thread's axis, and cam side 16e of the female thread's cross-section slants prominently to the nut's axis. Thread surfaces 16d and 16e in this example do not form a sharp intersection; rather the thread has a blunted edge 16g. A sharp edge would add very little to the thrust resistance provided by the thread's shoulder.

The illustrative male thread on part 10 has an angle of 45° between its cam side 10e and its shoulder side 10d in this example. The same 45° angle (represented by lines 16d' and 16e', FIGS. 4 and 5) is provided between the shoulder and the slant or cam side of thread segments 16b. In addition, there is a wide space at the root of each thread (male and female) to accommodate the blunted extremity (e.g. 16g) of the mating thread.

In forming the assembly of FIG. 1, part 10 is inserted through spacer 14 and panel 12 (or spacer 14 may be omitted) and, while part 10 is held in place, nut 16 is pushed onto part 10. As nut 16 moves over male threaded portion 10c, the thread segments 16b on each of the sectors 16a ratchet past the male threads. As thread segments 16b move from one convolution of the male thread to the next, sectors 16a are forced outward as cam sides 16e of the nut's thread segments are pushed along cam sides 10e of the male thread. The resulting outward spreading of sectors 16a is accommodated by resilient corrugations 16c. Ultimately nut 16 is pressed against panel 10. The nut is then turned to tighten the assembly. In this operation, shoulders 10d and 16d of the threads abut each other. Firm tightening is possible because shoulders 10d and 16d do not develop forces tending to spread sectors 16a so long as the tightening force does not distort the material and thereby force the transverse shoulders to tilt.

The buttress thread form of the male and female threads as described, together with the resilient connection of sectors 16a to each other, imparts an easy-on, strong retention characteristic. However, the described nut has distinctive properties. The stresses (and the reactions) developed at the ends of any thread segment 16b are equal when an effort is made to pull part 10 out of the nut. Also, the stresses and strains developed at each of the thread segments are essentially equal. This signifies that all the thread segments contribute alike to the retention of the nut, that none of the thread segments are being over-stressed while others are underutilized.

The external shape of nut 16 provides for a good grasp. A wrench can grip nut 16 at flats 16h, and corrugations 16c provide a good hand grip, when the nut is forcibly turned.

In the illustrative apparatus of FIG. 1, part 10 is a hollow fuse holder made of a molded, plastic part, providing electrical insulation. Threaded push nut 16 is also manufactured of a molded plastic. It is easily pushed into place and tightened, and easily unscrewed, yet it is capable of providing enormous resistance against being released unintentionally by random force against part 10. Unlike conventional push nuts of stamped sheet-metal, having spaced-apart teeth to grip a forcibly inserted part, the forces applied by nut 16 to part 10 are distributed almost uniformly, with no appreciable force that might distort tube 10.

In an example, the extent of thread segments 16b along the axis of nut 16 is ¼ inch; the diameter of nut 16, measured to the thread's root, is ½ inch; thread segment 16b (FIG. 5) is 0.046 inch, peak to root, and its pitch is 0.0417 inch; thread segments 16b extend around roughly 70% of the nut's inner circumference; corrugation 16c has a groove 1/16 inch deep by 3/64 inch wide and a wall thickness of 0.024 inch at the end and at the sides; and the minimum wall thickness of the nut (halfway between corrugations 16c) is 0.028 inch; all these dimensions being subject tolerance deviations. In rough preliminary tests of a nylon push nut with these dimensions, the push-on force was four-to-five pounds and the pull-apart force was 60 pounds. Of course, these values can be varied widely by changes in the kind of plastic used, in the nut's several dimensions, in the number and form of corrugations 16c, and so on.

The illustrative push nut, as well as the illustrative fastener that includes the male threaded part and the push nut, are subject to many modifications. Thus (as already noted) the form of corrugations 16c can be varied, retaining the properties of resilient and flexible connections between adjoining sectors 16a. This and other changes will be apparent to those skilled in the art. Consequently, the claims should be construed broadly in accordance with the spirit and scope of the invention.

What is claimed is:

1. A push nut movable along a male threaded device in response to moderate thrust in one direction while strongly resisting thrust in the opposite direction, said push nut having an axial passage and being divided into multiple sectors and multiple resilient corrugations occurring in alternation about said passage, each sector having side margins connected by two of said resilient corrugations to side margins of its neighboring sectors in such a manner that the corrugations develop constraint acting on each of said sectors that is distributed essentially uniformly along each such sector, each of said sectors having a series of thread segments distributed along said passage in the as-manufactured condition of the push nut, the thread segments of all the sectors serving collectively as a female thread, said thread segments of each sector having a cross-section, as viewed in a plane containing the axis of said passage, including respective essentially transverse shoulders facing in one direction and prominently slanted surfaces facing in the opposite direction.

2. A push nut as in claim 1, formed of a resilient molded plastic that imparts resilience to said corrugations.

3. A push nut as in claim 1 wherein each of said thread segments has substantial arcuate extent around the passage and wherein the constraint of the corrugations acting on the sectors is developed essentially equally at the opposite ends of the thread segments, respectively.

4. A fastener including a male threaded device and a companion push nut,
said push nut having an axial passage and being divided into multiple sectors and multiple resilient corrugations occurring in alternation about said passage, each sector having side margins connected by two of said resilient corrugations to side margins of its neighboring sectors in such a manner that the corrugations develop constraint acting on each of said sectors that is distributed essentially uniformly along each such sector, and each of said sectors having a series of thread segments distributed along said passage in the as-manufactured condition of the push nut, the thread segments of all the sectors serving collectively as a female thread, said thread segments of each sector having a cross-section, as viewed in a plane containing the axis of said passage, including respective essentially transverse shoulders facing in one direction and prominently slanted surfaces facing in the opposite direction,
said male threaded device having a male thread cooperable with said female thread and having a cross-section, as viewed in a plane containing the male thread's axis, having essentially transverse shoulders cooperable with said shoulders of the push nut's thread segments so as to largely obstruct movement of the push nut along the male threaded device in one direction while allowing the push nut to be assembled to the male threaded device in response to moderate thrust in the opposite direction.

5. A fastener as in claim 4, wherein said push nut is formed of a resilient molded plastic that imparts resilience to said corrugations.

6. A fastener as in claim 4 wherein each of said thread segments has substantial arcuate extent around the passage and wherein the constraint of the corrugations acting on the sectors is developed essentially equally at the opposite ends of the thread segments, respectively.

7. A fastener as in any of claims 6, 4 or 5 wherein said male threaded member is hollow, having a relatively thin wall that is subject to distortion by localized force.

* * * * *